United States Patent

Mabery et al.

[11] 4,314,130
[45] Feb. 2, 1982

[54] METHOD OF MAKING VARIABLY RIFLED TUBES

[75] Inventors: Thomas L. Mabery, East Ridge; Francis B. Jackson, Chattanooga, both of Tenn.

[73] Assignee: Combustion Engineering, Inc., Windsor, Conn.

[21] Appl. No.: 73,969

[22] Filed: Sep. 10, 1979

[51] Int. Cl.³ .................... B21D 53/06; B23K 11/32
[52] U.S. Cl. .................... 219/58; 29/157.3 R; 219/107; 228/173 E
[58] Field of Search ............ 228/173 E; 29/157.3 R, 29/456; 219/56, 58, 107; 165/179, 177; 140/112

[56] References Cited

U.S. PATENT DOCUMENTS

| | | | |
|---|---|---|---|
| 2,708,306 | 5/1955 | Lampton | 29/456 X |
| 2,917,820 | 12/1959 | Matheny | 29/456 X |
| 3,595,299 | 7/1971 | Weishaupt et al. | 165/179 X |
| 3,785,409 | 1/1974 | Smith | 219/56 X |

Primary Examiner—Joseph H. McGlynn
Assistant Examiner—K. J. Ramsey
Attorney, Agent, or Firm—Arthur E. Fournier, Jr.

[57] ABSTRACT

A method of providing tubes of the type intended primarily for use in boilers with a variably rifled interior surface. The function of the latter surface is to create turbulence within the tube operative to break up the laminar flow of the water or steam flowing therethrough so as to thereby promote more efficient heat transfer during steam generation and so as to minimize the susceptibility of the tube to overheat due to the effects of nucleate boiling. The subject method, which is predicated upon a determination of the rifled pattern that is required to provide the boiler tube with the desired heat transfer characteristics, includes the steps of providing a tube that it is desired to furnish with variable rifling, supporting the tube for rotation relative to the longitudinal axis thereof; providing a length of wire that is to be made to embody the configuration of the pattern of variable rifling desired; providing means for affixing the wire to the surface of the inner wall of the tube; inserting the length of wire into the tube interior while simultaneously effecting the rotation of the tube so as to thereby cause the wire to adopt the configuration of the pattern of variable rifling with which it is desired to provide the tube; and concomitant with the formation of a pattern of variable rifling with the length of wire, effecting the affixation of the wire to the inner wall of the tube so that the wire, when secured in place, embodies the configuration of the pattern of variable rifling that is sought to be provided in the tube.

4 Claims, 5 Drawing Figures

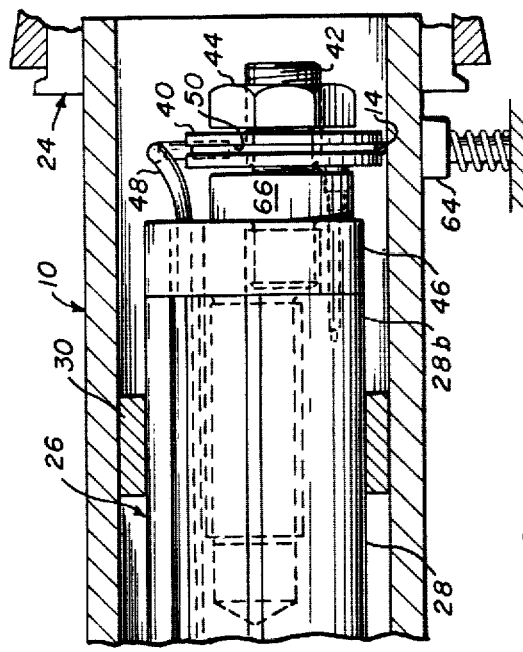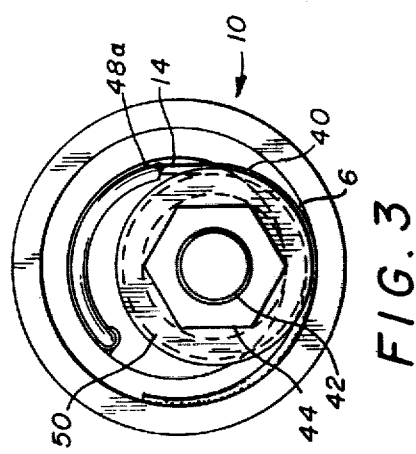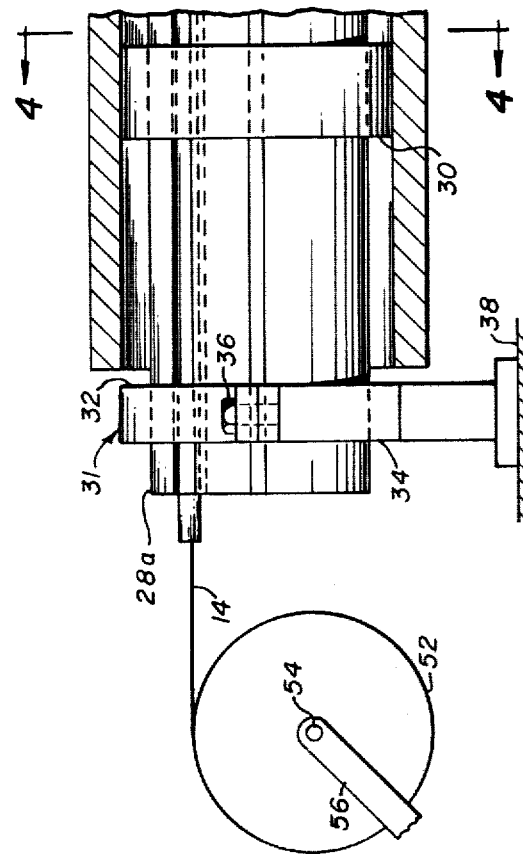

METHOD OF MAKING VARIABLY RIFLED TUBES

CROSS-REFERENCE TO RELATED APPLICATIONS

This application is hereby cross-referenced to the following two patent applications which were commonly filed herewith and which are commonly assigned: U.S. Patent application Ser. No. 06/073,967, filed Sept. 10, 1979 entitled, "RIB DESIGN FOR BOILER TUBES," filed in the name of Charles D. Hackett; and U.S. Patent application Ser. No. 06/073,968, filed Sept. 10, 1979 entitled, "METHOD OF FORMING VARIABLY RIFLED TUBES," filed in the names of Thomas L. Mabery, et al.

BACKGROUND OF THE INVENTION

This invention relates to tubing utilized in steam generating equipment, and more specifically to a method of forming variably rifled boiler tubes wherein the variable rifling is operative to provide controlled internal flow disruption within the tubes so as to thereby prevent stagnation of the steam bubbles that are formed during nucleate boiling.

It is well known to most that a major operating component of any conventionally constructed steam generating system is the boiler. Likewise, it is well known to all that it is in the boiler that the generation of steam is actually effected. In this regard, the aforesaid generation of steam is commonly accomplished as a consequence of the passage of water through a multiplicity of tubes during which passage the water is sufficiently heated so as to cause it to change state, i.e., to change from a liquid to a vapor.

It is obviously important that boiler tube failure be avoided in such steam generating systems. Relative to the matter of boiler tube failure, one known thereof is overheating of the tubes. Furthermore, it is known that an inefficient transfer of heat through the tube wall to the water flowing therewithin can lead to the tube overheating. The reference here to an inefficient transfer of heat through the tube wall is meant to encompass the situation wherein the accomplishment of the desired heat transfer process is impeded by the presence of so-called nucleate boiling, i.e., wherein stagnation of steam bubbles that function in the nature of insulation impedes the passage of the heat through the tube wall to the water flowing therewithin.

To summarize, the condition which is sought to be avoided here in an effort to minimize the susceptibility of the tubes to become overheated as a result of nucleate boiling, is that wherein there exists within the tube a laminar flow of water or steam. As used herein, the term laminar flow is meant to refer to a stream line or viscous flow of the fluid axially of the tube. Namely, it is desired to effect the breaking up of such laminar flow in the tube.

As the water flows through the tube, the outer layer of the water, i.e., the layer of water in closest proximity to the inner wall of the tube, becomes heated by the heat being transmitted through the tube wall. As a consequence thereof, the outer layer of water changes to steam. During this process of changing to steam, the first change, which the outer layer of water undergoes, is the formation therein of steam bubbles. It has been previously mentioned hereinbefore that steam bubbles act as an insulation. Consequently, unless the steam bubbles, which are being formed in the outer layer of water are made to mix, they will, in essence, remain stationary, i.e., stagnate and take on the attributes of an insulative film, thereby causing localized hot spots to develop along the tube wall. Moreover, such hot spots, in turn, can cause overheating of the tube, and ultimately lead to tube failure. Additionally, unless they are made to mix, the steam bubbles, by virtue of their insulative capability, will also function to prevent further heating of the core of water, which is passing rapidly through the center of the tube in the form of laminar flow, as defined above.

Thus, from the preceding, it should be readily apparent that in order to achieve the rapid and efficient transfer of heat through the tube walls to the water flowing therewithin, there exists a need to provide some form of means that would be operative to effect the breaking up of the laminar flow of water through the tube. Namely, some such form of means is needed to effect the mixing of the outer layer of water and thereby also the steam bubbles entrained therein with the core of water flowing through the central region of the tube. One such form of means, which has been employed heretofore in the prior art, to achieve a controlled internal disruption of the flow of water through a boiler tube has involved the usage of ribbing, i.e., rifling, on the internal surface of the boiler tube.

As regards the nature of the existing prior art teachings relating to the matter of providing boiler tubes with rifled inner wall surfaces, reference may be had, by way of exemplification, for purposes of obtaining a familiarity therewith to the following U.S. Pat. Nos.: 3,088,494; 3,213,525; 3,272,961; 3,289,451 and 3,292,408. More specifically, U.S. Pat. No. 3,088,494, which issued to P. H. Koch, et al. on May 7, 1963, is directed to providing a vapor generating tube that has its interior wall formed with helical lands and grooves, which are proportioned and arranged in a particular predetermined fashion. In accord with another such exemplary prior art teaching, U.S. Pat. No. 3,213,525, which issued to W. M. Creighton, et al. on Oct. 26, 1965, is directed to a method of forming an internal rib in the bore of a tube wherein material is removed from the inner tube wall by means of a cutting operation to form the subject ribbing. A still further example of these prior art teachings can be found in U.S. Pat. No. 3,272,961, which issued to L. A. Maier, Jr., et al. on Sept. 13, 1966, and wherein a method and apparatus are taught for making ribbed vapor generating tubes and in accordance with which a rib is deposited on the inside surface of a tube by means of a welding process. U.S. Pat. No. 3,289,451, on the other hand, which issued to P. H. Koch, et al. on Dec. 6, 1966, is directed to a method and apparatus for forming internal helical ribbing in a tube wherein the internal ribbing is formed by means of a cold drawing operation. Finally, U.S. Pat. No. 3,292,408, which issued to J. R. Hill on Dec. 20, 1966, is directed to a method of forming internally ribbed tubes wherein the tube is provided with an asymmetrical helical groove so as to facilitate removal of the forming tool from the tube.

Notwithstanding the existence of the aforedescribed prior art teachings, there has nevertheless been demonstrated a need for a new and improved method of providing boiler tubes with a rifled interior surface. More specifically, the prior art methods that have been employed for this purpose heretofore have all been adversely characterized by the fact that they each suffer from certain notable disadvantages. For instance, those prior art methods and apparatus that involve the removal of metal from the interior wall surface of the tube to effect the formation thereat of helical lands and grooves suffer from the standpoint of cost. Namely, from a cost standpoint, effecting the formation of rifled tubes by means of methods involving the removal of metal from the inner tube surface constitutes a relatively uneconomical method of manufacturing the same. That is, it is relatively expensive to form helical grooves and lands in the inner wall surface of a tube by a metal removal process, and particularly in applications like the present one wherein there is a concomitant requirement that both the helical grooves and the helical lands each be of precise dimensions.

Another disadvantage from which prior art methods and apparatus for forming rifled tubes are known to suffer, and particularly such methods and apparatus wherein a metal deformation process is utilized involving the insertion of a member into the tube is the difficulty that has been encountered in effectuating the removal of the member from the tube following completion of the metal deformation process. More specifically, in accord with such methods and apparatus, a member having a predetermined external configuration is inserted into the tube, and thereafter the tube is reduced in diameter such that the helical pattern that the member embodies is formed in the inner wall of the tube. In order to thereafter remove this member from the tube, it is necessary, because of the fact that the interior surface of the tube has been deformed so as to become essentially an exact complement of the member's external surface, to virtually unscrew the member from the tube to effect the removal of the former from the latter. Generally speaking, the degree of difficulty that is encountered in effecting the removal of the aforesaid member from the tube is dependent on the length of the member, which has been inserted into the tube, and the relative extent to which the pattern formed on the inner tube wall is a true complement of the pattern formed on the external surface of the aforesaid member, i.e., to the extent that the member and the tube take on the attributes of a threaded fastener that is threadedly engaged in a cooperating threaded nut.

Still another disadvantage from which prior art methods and apparatus for effecting the formation of rifled boiler tubes are known to suffer is the inherent inflexibility associated with the use thereof insofar as concerns effectuating variations in the configuration of the pattern that is to be formed in the surface of the tube inner wall. Namely, as noted above, nucleate boiling can lead to the development of localized hot spots that, in turn, cause overheating and ultimately boiler tube failures. To minimize the establishment of such localized hot spots in boiler tubes stemming from the existence of nucleate boiling, it has been proposed by the prior art to provide ribbing, i.e., rifling, on the inner wall surface of the tube. Unfortunately, however, the methods and apparatus known in the prior art here-to-date for effectuating the making of such rifled tubing render it difficult to enable significant variations in pattern configuration to be implemented for purposes of compensating for variations in the location of potential hot spots along the inner walls of the tubes. That is, existing methods and apparatus are limited to the utilization of fixed patterns, such that each boiler tube irrespective of the location it occupies in the boiler, i.e., its relative exposure to external sources of heat, is necessarily provided with the same pattern of rifling, even though from a heat transfer standpoint, it may be desirable to vary the pattern as between locations within the same tube, as well as between tubes in the same boiler.

By way of exemplification in this regard, reference is had to U.S. Pat. No. 3,272,961 to which reference has previously been had hereinbefore. This patent contains a teaching of providing a boiler tube with rifling in the form of a weld deposit. The method and apparatus as taught therein, however, are disadvantageously characterized by their total lack of flexibility in effecting adjustments in the rifled pattern that is being formed in a boiler tube to compensate for providing the boiler tube with different heat transfer characteristics in various locations along the length thereof. Namely, in accord with the teachings of U.S. Pat. No. 3,272,961, the implementation of the formation of a rifled pattern in a tube is predicated upon the creation of a pattern that comprises a repeat of the same rifling configuration for the entire length of each individual boiler tube. Moreover, not only are changes in pattern of rifling as between different locations in the same tube difficult to effect with the apparatus described in the referenced U.S. Pat. No. 3,272,961, but also, it is difficult therewith to effect changes in pattern of rifling as between different tubes, wherein it is desired to have them embody individually different heat transfer characteristics. Principally, this is because to effect such changes requires the establishment of completely different relationships between the components, i.e., tube, welding means, etc., from those which these components bear one to another in order to effectuate the formation in a boiler tube of a given pattern of rifling. Namely, these components must have different relationships one to another for each different pattern of rifling with which it is desired to provide a boiler tube.

To summarize, a method of providing boiler tubes with a rifled inner surface is desired that would embody, among others, the following characteristics. First, there is desired a method that from the standpoint of cost of manufacture is relatively economical to utilize. Secondly, a method is desired, which, from the standpoint of ease of usage, is relatively simple to employ, yet is capable of accomplishing its intended function in an effective and efficient manner. Thirdly, a method is desired, which is characterized by the fact that it enables a selection to be made from amongst a diversity of patterns of rifling that are capable of being employed in a boiler tube inner wall, such that the nature of the configuration of the rifled pattern with which a boiler tube is provided can be varied so as to provide the boiler tube with the specific heat transfer characteristics desirably required throughout the length thereof, as well as different rifled patterns wherein such as needed to fulfill different heat transfer requirements as between different individual boiler tubes.

It is, therefore, an object of the present invention to provide a new and improved method of making boiler tubes wherein the latter are provided with means operative to cause a controlled internal flow disruption to be effected therewithin.

It is another object of the present invention to provide such a method of making boiler tubes wherein the latter are provided with inner tube surfaces that are rifled.

It is still another object of the present invention to provide such a method of making boiler tubes, which is operative to enable boiler tubes to be provided that are variably rifled.

A further object of the present invention is to provide such a method of making a variably rifled boiler tube wherein the pattern of rifling desired to be formed in the tube inner wall is established by inserting a wire into the interior of the tube such that the wire embodies the configuration of the desired pattern of rifling.

A still further object of the present invention is to provide such a method of making a variably rifled boiler tube wherein the wire embodying the configuration of the pattern or rifling desired is affixed to the tube inner wall.

Yet another object of the present invention is to provide such a method of making a variably rifled boiler tube wherein the wire embodying the configuration of the pattern of rifling desired is affixed to the tube inner wall by being welded thereto.

Yet still another object of the present invention is to provide such a method of making a variably rifled boiler tube which is advantageously characterized by the fact that it is relatively inexpensive to utilize, relatively simple to employ, and is extremely flexible insofar as concerns the variety of different patterns of rifling that can be formed in boiler tubes through the use thereof.

SUMMARY OF THE INVENTION

In accordance with the present invention, there is provided a method of providing tubes with a variably rifled interior surface. The function of the latter surface is to create turbulence within the tube operative to break up the laminar flow of the water or steam flowing therethrough so as to thereby promote more efficient heat transfer during steam generation and so as to minimize the susceptibility of the tube to overheat due to the effects of nucleate boiling. The subject method includes the steps of providing a tube that is to be furnished with variable rifling; supporting the tube for rotation relative to the longitudinal axis thereof; providing a length of wire that is to be affixed to the inner wall surface of the tube; providing welding means that includes a conductor inserted into the tube interior which is operable to supply welding power energy therethrough, and a grounding member which is supported externally of the tube in contacting relation thereto; feeding the length of wire into the tube interior while simultaneously effecting the rotation of the tube so as to thereby form a pattern of variable rifling with the wire; concomitant with the formation of a pattern of variable rifling with the length of wire, effecting the affixation of the wire to the inner wall of the tube by supplying through operation of the welding means, welding power thereto so as to cause a continuous weld to be formed between the wire and the tube inner wall in such a manner that the tube interior surface is provided with a pattern of variable rifling consisting of the wire which is welded thereto to form a variable rifled pattern therewithin; and effecting the non-operativeness of the welding means by withdrawing the conductor from the tube interior and by disengaging the grounding member from contacting relation with the tube outer surface.

BRIEF DESCRIPTION OF THE DRAWING

FIG. 2 is a side elevational view, partially in section, of an apparatus that is operable for performing the method of providing a tube with variable rifling in accordance with the present invention;

FIG. 3 is an end view of the apparatus of FIG. 2 in accordance with the present invention, shown with some parts omitted for purposes of clarity of illustration;

FIG. 4 is a cross sectional view of a portion of the apparatus of FIG. 2 in accordance with the present invention, taken substantially along the line 4—4 in FIG. 2.

DESCRIPTION OF A PREFERRED EMBODIMENT

Figure 1:
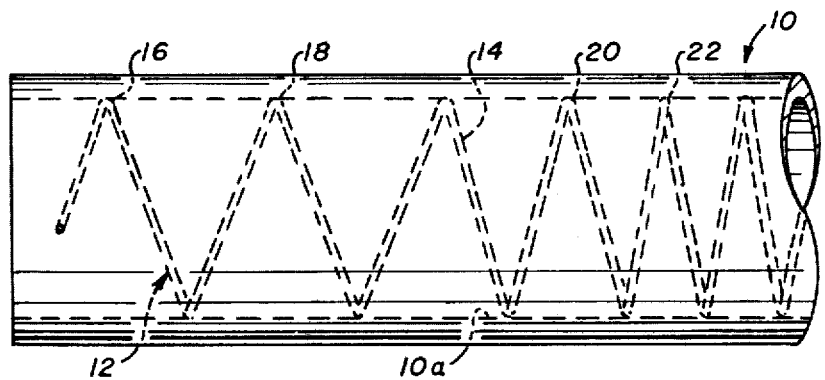
FIG. 1 is a side elevational view of a portion of a tube that has been provided with variable rifling in accordance with the method of the present invention.

Referring now to the drawing, and more particularly to FIG. 1 thereof, there is depicted therein a portion of a tube, generally designated by reference numeral 10, which has been provided with variable rifling, generally designated by reference numeral 12, through the use of the method of the present invention in a manner that will be described herein more fully subsequently. In accord with the best mode embodiment of the invention, the tube 10 preferably comprises a portion of a boiler tube, and the variable rifling 12 comprises a wire 14 that embodies the configuration of the pattern of rifling that is desired and which is affixed to the inner wall surface 10a of the tube 10. In this regard, note is to be taken of the fact that with particular reference to FIG. 1 of the drawing, the axial distance between adjacent helixes of the wire 14 varies axially along the length of the tube 10. More specifically, the distance measured axially along the wire 14 between the points designated by reference numerals 16 and 18 in FIG. 1 is greater than the distance measured along the wire 14 between the points designated by reference numerals 20 and 22 in the same Figure of the drawing.

A description will now be had of one form of apparatus that is employable for purposes of performing the method of providing a tube with variable rifling in accordance with the present invention. To this end, reference will be had particularly to FIGS. 2-4 of the drawing. Thus, as shown in FIG. 2, the tube 10 has one end thereof suitably mounted in a gripping collet, generally designated by reference numeral 24. Since the collet 24 is of conventional construction, it is deemed sufficient for purposes of obtaining an understanding of the present invention to simply illustrate a portion thereof in the drawing. Further, the collet 24 preferably constitutes a part of a conventional spiral fin welding machine (not shown). Inasmuch as the nature of the construction of such a welding machine (not shown) is well known to those skilled in the art, it is not deemed necessary for purposes of obtaining an understanding of the method of the present invention to describe and illustrate the details of construction of such a machine in the instant application. Rather, it is deemed sufficient to merely note that the collet 24 is operative to securely grip one end of the tube 10 so that movement of the collet 24 is effectively transmitted therethrough to the tube 10. Moreover, the welding machine (not shown) is operative to impart the required rotational and longitudinal movement to the appropriate components, as will be referred to more fully herein subsequently. Although not depicted in FIG. 2 of the drawing, it is to be understood that the tube 10 may, without departing from the essence of the present invention, be additionally supported at points intermediate the length thereof such as through the use of conventional support means, including, for example, rollers wherein the tube 10 is made to rest on the rollers, in order to prevent the tube 10 from sagging relative to the plane defined by the longitudinal axis of tube 10.

Continuing with a description of the apparatus that is depicted in FIGS. 2-4 of the drawing, the tube 10 has supported within the interior thereof carrier means, generally designated by reference numeral 26. More specifically, the carrier means 26 is suitably supported so as to remain substantially stationary while the tube 10 is made to rotate relative thereto through the action of the aforedescribed collet 24 with which the tube 10 is cooperatively associated. The carrier means 26 includes an elongated, substantially cylindrical member, i.e., carrier 28, that is suitably dimensioned so as to be receivable within the interior of the tube 10 and so as to extend the desired distance therewithin. Interposed between the external surface of the carrier 28 and the surface of the inner wall 10a of the tube 10 are a multiplicity of bearing rings 30. Although a pair of bearing rings 30, suitably spaced one to another, are shown in FIG. 2 of the drawing, it is to be understood that a greater or a lesser number of rings 30, if deemed desirable, could be employed in spaced relation one to another along the length of the carrier 28 without departing from the essence of the present invention. The function of the bearing rings 30, as the name thereof implies, is to provide a bearing surface between the inner wall of the tube 10 and the external surface of the carrier 28 as the former is made to rotate about the latter.

As best understood with reference to FIG. 2, one end 28a of the carrier 28 preferably projects outwardly of the tube 10, and is suitably supported in a support means, the latter being generally designated in the drawing by reference numeral 31. The latter support means 31 may embody any suitable form of conventional construction. By way of exemplification, in accord with the illustrated embodiment thereof, the support means 31 comprises a frame structure of two-part construction. Namely, the support means 31 includes a pair of semicircular members 32 and 34 suitably configured so as to be capable of receiving the carrier 28 therebetween. The members 32 and 34 in turn are suitably secured together through the use of conventional fastening means, i.e., one or more threaded fasteners 36, so as to securely retain the carrier 28 therewithin. The support means 31, as depicted in FIG. 2, preferably is designed to rest on some form of a suitable base 38.

At the other end 28b thereof, the carrier 28 has a wire guide wheel 40 cooperatively associated therewith for a purpose yet to be described. More specifically, as best understood with reference to FIGS. 2 and 3 of the drawing, the wire guide wheel 40 is mounted on a threaded member 42, and is suitably retained thereon through the use of a threaded nut 44 that is threadedly engaged on the member 42. The threaded member 42, in turn, is secured to the carrier 28 through the use of any suitable conventional form of fastening means (not shown), e.g., the member 42 may be threadedly engaged in a threaded opening (not shown) formed for this purpose in a collar-like portion 46 with which the carrier 28 is suitably provided at the end 28b thereof.

As best understood with reference particularly to FIGS. 2 and 3 of the drawing, there is provided a wire feed tube 48 that is suitably supported within the carrier 28 so as to extend the length thereof. Moreover, the wire feed tube 48 has one end 48a thereof suitably positioned in juxtaposed relation to the wire guide wheel 40, and more specifically, the wire receiving groove 50 with which the wire guide wheel 40 is provided. The other end 48b of the wire feed tube 48 projects outwardly of the carrier 28 and is designed to have fed thereto wire 14 from a suitably dimensioned wire reel 52. The latter wire wheel 52 is of conventional construction. As illustrated in FIG. 2 of the drawing, the wire wheel 52 is mounted on a shaft 54 for rotation for purposes of effecting the unwinding of the wire 14 therefrom. In this regard, it is to be understood that it is encompassed within the present invention that the rate of unwinding of the wire 14 from the wire reel 52 may be adjusted, i.e., the wire 14 may be unreeled and fed at a rate depending on the deposition thereof related to relative motion of tube rotation and rate of longitudinal motion. The shaft 54, in turn, is suitably supported by a pair of arms 56 (only one of which is visible in FIG. 2). The other ends of the arms 56 may be supported in any suitable manner through the use of any suitable form of support means (not shown). For a reason yet to be set forth, the wire feed tube 48 is formed of a suitable electrical insulative material.

Figure 5:
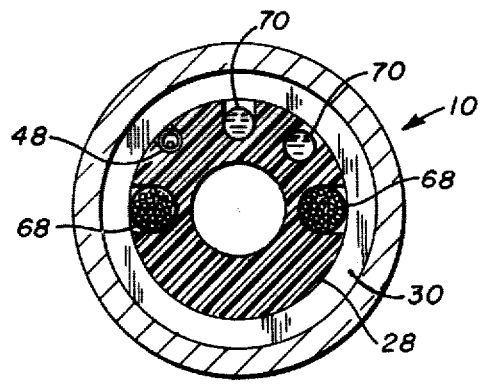
FIG. 5 is a cross sectional view, similar to FIG. 4, illustrating a modified form of apparatus that is operable for performing the method of providing a tube with variable rifling in accordance with the present invention.

Referring next to FIGS. 4 and 5 of the drawing, there are illustrated therein alternative forms of construction, which the apparatus of FIG. 2 may embody in order to effectuate the method of the present invention. Considering first the nature of the construction shown in FIG. 4, the latter Figure is a cross sectional view taken substantially along the line 4—4 in FIG. 2, and represents the preferred form of construction. As shown therein, the outer member comprises the tube 10. Internally of the tube 10 at spaced locations along the length thereof there are provided bearing rings 30. Next there is illustrated suitable welding means, the latter being cooperatively associated with the carrier 28 so as to be operative for welding the wire 14 to the internal surface 10a of the tube 10, in a manner to be described more fully hereinafter. As best understood with reference to FIG. 4 of the drawing, the aforesaid welding means encompasses a copper power supply shown at 58. Note will be taken of the fact that the wire feed tube 48 is positioned in juxtaposed relation to the inner surface of the copper power supply 58. Accordingly, as mentioned previously above, the wire feed tube 48 is formed from a suitable conventional type of electrical insulation material.

There are, in addition, depicted in FIG. 4 suitable water in and outlet tubes, generally designated by the common reference numeral 60, which extend axially of the carrier 28 and are located in juxtaposed relation to the inner surface of the copper power supply 58. Additionally, suitable insulation, generally designated by reference numeral 62, is preferably interposed within the circular copper power supply 58 along the diameter thereof and so as to extend axially thereof. Completing a brief description of the aforesaid welding means, reference is had to FIG. 2 of the drawing wherein a conventional external ground shoe 64 of suitable construction is supported in contacting relation to the external surface of the tube 10. Also, a spring loaded contact shoe 66 is suitably mounted through the use of any conventional type of mounting means (not shown) in interposed relation between the collar-like portion 46 and the wire guide wheel 40 so that the spring loaded contact shoe 66 has a portion thereof, which is spring biased into contacting engagement with the wire guide wheel 40. Thus, the aforesaid welding means is operative in a manner well known to those skilled in the art to generate welding power energy, which, in turn, as a consequence of the heat of fusion that is produced effectuates the welding of the wire 14 to the tube inner surface 10a. The afore-referenced heat of fusion, which can be seen at 6 in FIG. 3, produces a continuous weld of the wire 14 to the inner surface 10a of the tube 10. The welding power energy follows a path, which includes the copper power supply 58, the spring loaded contact shoe 66, the wire guide wheel 40, the wire 14, the tube inner surface 10a and the external ground contact shoe 64. Although not shown in the drawing in the interest of maintaining clarity of illustration therein and inasmuch as the nature of the construction thereof is well known to those skilled in the art, it is nevertheless to be understood that in accord with conventional practice suitable external connections are effected to the copper power supply 58, the water in and outlet tubes 60, and the external ground contact shoe 64.

Turning now to a consideration of the alternative form of construction depicted in FIG. 5 of the drawing, the latter is generally similar to the form of construction illustrated in FIG. 4, and which has been described above. More specifically, as shown in FIG. 5, a pair of power supply cables 68 are shown being utilized in place of the copper power supply 58 depicted in FIG. 4. A greater number of such power supply cables 68 could also be employed, if deemed desirable. Moreover, the nature of the water in and outlet tubes, generally designated by the common reference numeral 70 in FIG. 5 differ somewhat in terms of dimensions and relative positioning within the carrier 28 as compared to the water in and outlet tubes 60 employed in the form of construction illustrated in FIG. 4. However, the tubes 60 and the tubes 70 are intended to perform the same function.

With further reference to FIG. 5, the tube 10, the bearing ring 30, the carrier 28 and the insulated wire feed tube 48 as employed in the form of construction depicted therein are essentially identical to the corresponding components shown in FIG. 4, and, thus, are identified by the same reference numerals in both FIGS. 4 and 5. Moreover, it is to be understood that the aforesaid power supply cables 68 along with the water in and outlet tubes 70 comprise some of the operating components of a welding means that is operative like the welding means described above in connection with the consideration of the form of construction illustrated in FIG. 4 to effectuate a welding of the wire 14 to the inner surface 10a of the tube 10. Inasmuch as the nature of the construction of such welding means as well as the mode of operation thereof are well known to those skilled in the art, it has not been deemed necessary to set forth in any greater detail herein the specifics thereof. Rather, for purposes of obtaining an understanding of the method of the present invention, it is deemed sufficient to merely note that welding means of the type exemplified by the constructions illustrated in FIGS. 4 and 5 of the drawing are representative of the type of apparatus that can be employed to effectuate a continuous weld between the wire 14 and the tube inner surface 10a. Finally, as in the case of the copper power supply 58, the water in and outlet tube 60, etc., it is to be understood that suitable external connections, although not shown in the drawing in the interest of maintaining clarity of illustration thereof, and because of the conventional nature thereof, are effected to the power supply cables 68, the water in and outlet tubes 70, etc., which are embodied in the alternative form of construction that is illustrated in FIG. 5.

It can, thus, be seen that in accordance with the present invention, there is provided a method of furnishing tubes with a variably rifled interior surface. The subject method is predicated upon a determination of the variable rifled pattern that is required to provide the boiler tube with the desired heat transfer characteristics to prevent the boiler tube from overheating as a consequence of the existence of nucleate boiling. This method includes the step of providing a tube that it is desired to furnish with variable rifling. In this regard, it is to be noted that the method of the present invention is advantageously characterized as compared to the prior art method of providing tubes with ribbing in that, with the present method, it is possible to employ a tube, which, at the start of the performance of the method of the present invention, embodies the specific dimensions of a finished tube, especially in terms of wall thickness, i.e., the dimensions that it is desired that the tube possess in order to meet the strength, etc., requirements dictated therefor by the operating parameters to which the tube is to be subjected in an operating environment. Reference is had here particularly to the minimum wall thickness of the tube measured at the grooves, which when taken with the associated lands, constitute the rifling of the tube. In contrast thereto, in accord with the prior art methods, especially those wherein material is machined from the tube inner surface to provide a tube with internal rifling, it is necessary to start with a tube of increased wall thickness in order that the tube embody the desired minimum wall thickness, measured at the grooves formed therein, following the step of metal removal performed in the course of providing the tube with rifling. In terms of cost, there is a significant penalty associated with the need to employ a tube of increased wall thickness, in the performance of a method of providing a tube with rifling. To summarize, the method of the present invention is performed on a tube embodying the dimensions in terms of wall thickness desired of a finished tube, whereas prior art methods, for the most part, are predicated upon the utilization of a tube, which needs to be oversized in terms of wall thickness to begin with and which, during the course of being provided with ribbing, is subjected to the effectuation of a reduction in wall thickness. The subject method further includes the steps of supporting the tube for rotation relative to the longitudinal axis thereof; providing a length of wire that is made to embody the configuration of the pattern of variable rifling desired; providing welding means for affixing the wire to the surface of the inner wall of the tube; inserting the length of wire into the tube interior while simultaneously effecting the rotation of the tube so as to thereby cause the wire to adopt the configuration of the pattern of variable rifling with which it is desired to provide the tube; and concomitant with the formation of a pattern of variable rifling with the length of wire, effecting the affixation of the wire to the inner wall of the tube by the establishment of a continuous weld therebetween so that the wire when welded in place embodies the configuration of the pattern of variable rifling that is sought to be provided in the tube. The configuration of the pattern of variable rifling with which the tube is provided is provided through the controlled operation of the rate of rotation of the tube 10 and/or the rate of feed of the wire 14 from the wire reel 52. In accord with the best mode embodiment of the invention, the tube 10 is rotated relative to the wire 14, however, the method of the present invention is not intended to be limited to such a mode of operation. Rather, from the standpoint of the operativeness of the method of the present invention, the important consideration is that relative motion exist between the tube 10 and the wire 14.

There is, thus, provided in accord with the present invention a new and improved method of making boiler tubes wherein the latter are provided with means operative to cause a controlled internal flow disruption to be effected therewithin. Moreover, the subject method of the present invention encompasses the making of boiler tubes wherein the latter are provided with inner tube surfaces that are rifled. In addition, in accord with the present invention, a method of making boiler tubes is provided wherein the boiler tubes made thereby are capable of being provided with variable rifling. Furthermore, the method of the present invention enables the pattern of rifling desired to be formed in the tube inner surface to be established by the insertion of a wire into the interior of the tube such that the wire embodies the configuration of the desired pattern of rifling. The configuration of the pattern of rifling is established through coordinated action of the tube rotating means and the wire feed means. Additionally, in accordance with the present invention, a method of making a variably rifled boiler tube is provided wherein the wire embodying the configuration of the pattern of variable rifling desired is affixed to the tube inner wall. Also, the method of the present invention contemplates the affixation of the wire embodying the configuration of the pattern of variable rifling desired to the tube inner wall by means of the establishment of a continuous weld therebetween. Furthermore, in accord with the present invention, a method of making a variably rifler boiler tube is provided which is advantageously characterized by the fact that it is relatively inexpensive to utilize, relatively simple to employ and which is extremely flexible insofar as concerns the variety of different patterns of rifling that can be formed in boiler tubes through the use thereof.

While only one embodiment of our invention has been shown, it will be appreciated that modifications thereof, some of which have been alluded to hereinbefore, may still be readily made thereto by those skilled in the art. We, therefore, intend, by the appended Claims, to cover the modifications alluded to herein as well as all other modifications, which fall within the true spirit and scope of our invention.

What is claimed is:

1. A method of providing a tube with a predetermined pattern of variable rifling for purposes of imbuing the tube with the requisite heat transfer characteristic comprising the steps of:
    (a.) providing a tube to be furnished with variable rifling;
    (b.) providing a length of wire to be affixed to the inner wall of the tube;
    (c.) supporting the tube and the length of wire relative to each other so as to enable relative motion to be had therebetween;
    (d.) inserting a conductor operable to supply welding power energy therethrough into the interior tube:
    (e.) supporting a grounding member externally of the tube in cooperative association with the outer surface of the tube;
    (f.) feeding the length of wire into the interior of the tube;
    (g.) effecting relative motion between the length of wire and the tube simultaneous with the feeding on the length of wire into the tube interior;
    (h.) coordinating the rate of feed of the length of wire with the relative motion occurring between the length of the wire and the tube;
    (i.) configuring the length of wire into the form of the pattern of variable rifling required to provide the tube with the desired heat transfer characteristics as the length of wire is being fed into the tube interior, by virtue of the coordination effected between the rate of feed of the length of wire and the relative motion occuring between the length of wire and the tube;
    (j.) supplying welding power energy through the conductor to weld the length of wire in the form of the requisite pattern of variable rifling to the inner wall of the tube by establishing a continuous weld between the length of wire and the tube inner wall;
    (k.) withdrawing the conductor from the interior of the tube after length of wire has been welded to the inner wall of the tube; and
    (l.) removing the grounding member from cooperative association with the outer surface of the tube.

2. The method as set forth in claim 1 further including the step of rotating the tube to produce relative motion between the length of wire and the tube.

3. The method as set forth in claim 2 wherein the tube to be furnished with variable rifling that is provided has a wall thickness equivalent in dimension to that of a finished tube.

4. The method as set forth in claim 3 wherein the continuous weld that is established between the length of wire and the tube inner wall is effected without altering the wall thickness dimension of the tube.

* * * * *